No. 878,020. PATENTED FEB. 4, 1908.
A. B. RICE.
CULINARY BOILER OR STEAMER.
APPLICATION FILED JUNE 15, 1906.

Witnesses:
Lillian Prentice
Katharine Gerlach

Inventor.
Alfred B Rice
By Peirce + Fisher
Attys.

UNITED STATES PATENT OFFICE.

ALFRED B. RICE, OF RACINE, WISCONSIN.

CULINARY BOILER OR STEAMER.

No. 878,020.

Specification of Letters Patent.

Patented Feb. 4, 1908.

Application filed June 15, 1906. Serial No. 321,838.

*To all whom it may concern:*

Be it known that I, ALFRED B. RICE, a citizen of the United States, and a resident of the city and county of Racine, in the State of Wisconsin, have invented certain new and useful Improvements in Culinary Boilers or Steamers, of which I do declare the following to be a full, true, and exact description, reference being had to the accompanying drawing, forming part of this specification.

The present invention has relation to that class of culinary boilers or steamers in which the article of food to be cooked or treated is placed within an inner vessel that is located within an outer vessel wherein the steam will be generated.

The object of the invention is primarily to provide an improved construction of apparatus whereby the steaming or cooking of food products may be more effectively accomplished, and the invention consists in the features of construction hereinafter described, illustrated in the accompanying drawing and particularly pointed out in the claims at the end of this specification.

In Letters Patent No. 771,830, granted to me October 11, 1904, there is set forth a culinary boiler or steamer having certain peculiarities of construction and which was especially designed for the steaming or treatment of fruit in order to more effectively extract the juices therefrom.

The present invention, while capable of other uses, is also more particularly designed for the steaming of fruit, vegetables or the like in order to enable the juices to be extracted therefrom, and one main purpose of the invention is to provide a construction of such character that the flavors of the fruit will be more effectively retained within the juices and will be prevented from so readily escaping to the atmosphere, as was apt to with the construction set forth in my above mentioned patent.

Figure 1:
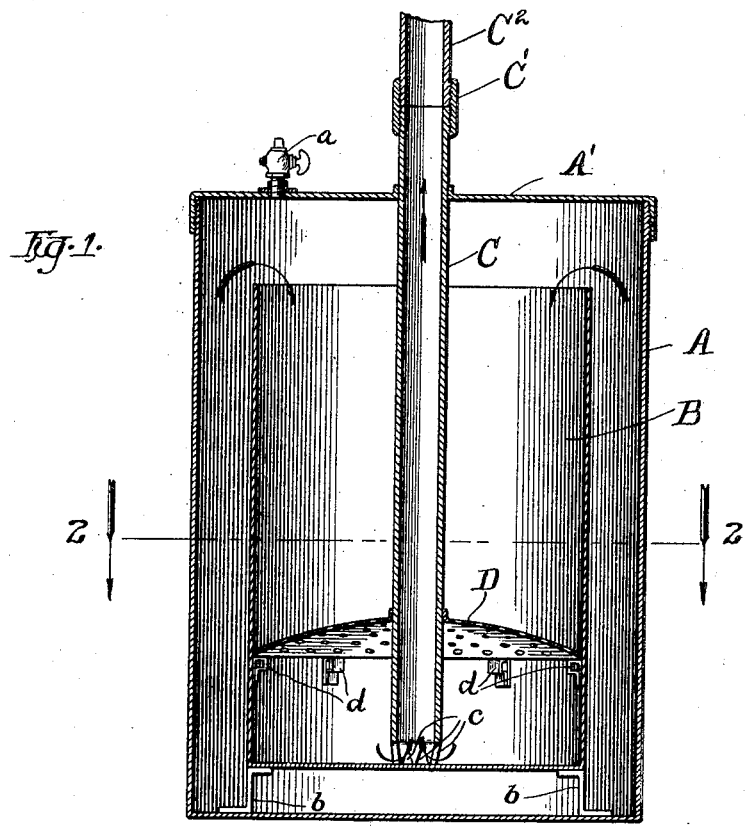
Figure 2:
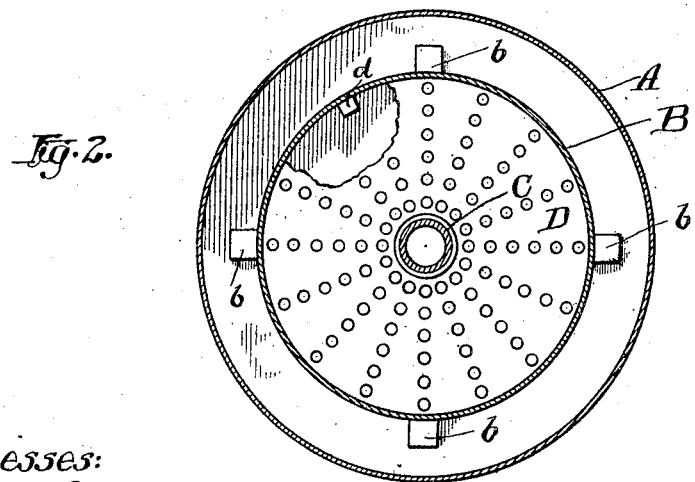

Referring to the accompanying drawing, Figure 1 is a view in central vertical section through a boiler or steamer embodying my invention. Fig. 2 is a view in horizontal cross section on line 2—2 of Fig. 1.

A designates the outer casing or boiler that will contain the water or other liquid that is to be converted into steam. The outer boiler or casing A is provided with a cover A' that may be secured thereto in any suitable manner, as, for example, by a screw-threaded joint. As shown, the cover A' of the boiler A is provided with a stop cock $a$ whereby air may be admitted to the interior of the vessel A, when required.

Within the boiler A is placed the inner vessel B that is open at its top and has its bottom resting upon legs $b$ that serve to sustain this vessel B above the bottom of the boiler A. The vessel B is considerably smaller in diameter than the boiler A and the space within the boiler A beneath the bottom of the vessel B and between the side walls of the vessel B and boiler A will serve to receive the water or other liquid that is to be converted into steam.

Through the cover $A^1$ of the boiler A extends a pipe C, the lower end of which depends to a point at or adjacent the bottom of the vessel B. As shown, the lower end of the pipe C is formed with open spaces $c$ to permit steam or fluid to enter the pipe C, or the lower end of the pipe C may be simply raised a slight distance above the bottom of the vessel B. Preferably the pipe C is brazed or soldered to the cover A' or is connected thereto in any other convenient manner to form an air tight joint between these parts. The pipe C is shown as provided with a screw-thread at its upper end that may be united by a coupling C' with a pipe $C^2$ that will lead to any convenient receptacle into which the contents of the vessel B are to be converted.

As shown, a false bottom D is provided within the vessel B, this false bottom resting preferably upon lugs $d$ projecting inward from the side walls of the vessel B; and the false bottom is perforated and is formed with a central opening through which the pipe C will pass.

One of the uses to which my present invention has been found to be especially well adapted, is the extraction of grape juice from grapes, as well as the extraction of juices from fruits and vegetables of various kinds. Assuming the apparatus to be used for such purpose, the grapes or vegetables from which the juices are to be extracted will be placed within the vessel B and will rest upon the false bottom D. The boiler A will then be charged with water or other liquid to any desired height below the top of the vessel B, and the boiler A will then be exposed to heat sufficient to generate steam from the liquid therein. As the steam is generated, it will rise to the top of the boiler A, will pass in the direction of the arrows shown at the top of the vessel B down through the contents of the vessel B and finally up through the pipe C, as indicated by the arrows shown upon such pipe in Fig. 1 of the drawing. At the begining of the operation the steam will pass quite freely through the pipe C, but as the fruit or vegetables are thus subjected to the action of the steam, their juices collect within the bottom of the vessel B and serve in a measure to condense the steam as it tends to escape through the pipe C. The result is that before the steaming operation is completed, the juices rise to some distance in the pipe C. When the fruit or vegetables have been submitted to the steaming operation for a sufficient length of time, the heat will be reduced so that the liquid within the boiler A will be maintained below the boiling point, and the juices will continue to drip through the false bottom D of the vessel B and to rise within the pipe C. But inasmuch as the pipe C has its lower end at such time dipping beneath the surface of the juice within the bottom of the vessel B, a free escape of the vapors from the vessel B is prevented. The result is that during both the steaming and the straining or draining operation the free escape of the vapors is prevented and thus the natural fruit or vegetable flavors are much more effectively retained within the juices in the bottom of the vessel B, than would be possible with any construction in which a free escape is permitted of the vapors from the fruits or vegetables being treated.

When it is desired to withdraw the juices from the bottom of the vessel B, and particularly if it is desired to bottle the juices without exposure to the atmosphere, I prefer that a pipe $C^2$ shall be attached to the upper end of the discharge pipe C and this pipe $C^2$ will lead to the bottle, demijohn or like receptacle into which the juices are to be drawn. A vacuum will then be produced in the bottle, demijohn or like receptacle so as to cause the atmospheric pressure to force the juices from the bottom of the vessel B up and out through the discharge pipe C and the pipe $C^2$, and when the liquid contents of the vessel B are thus being withdrawn, the cock $a$ in the cover A' of the boiler A will be opened, so as to allow air to enter the boiler A.

If desired, a relief valve may be placed upon the top of the boiler A, or, the cock $a$ may be opened more or less, should it be found desirable.

It is manifest that the precise details of construction above set forth may be varied without departure from the novelty of the invention.

Having thus described my invention, what I claim as new and desire to secure by Letters Patent, is:—

1. A boiler of the character described, comprising an outer casing, an inner vessel of smaller diameter arranged within said outer casing and open at its top, a perforated false bottom within the inner vessel and a discharge pipe leading from beneath the false bottom of the inner vessel above the open top of said inner vessel and through the upper part of the outer casing, said outer casing being closed against the escape of steam except through said discharge pipe.

2. A boiler of the character described, comprising an outer casing having a cover secured thereto, an inner vessel of smaller diameter arranged within said outer casing and being open at its top, a discharge pipe leading downward through the cover of said outer casing to a point near the bottom of the inner vessel and a perforated false bottom within said inner vessel arranged above the lower end of said discharge pipe whereby the steam will pass through the material and whereby the juices extracted may be withdrawn through said discharge pipe.

3. A boiler of the character described, comprising an outer casing having a cover secured thereto and having a vent cock, an inner vessel of smaller diameter arranged within said outer casing, said inner vessel being open at its top to permit the steam to pass downward therethrough, a perforated false bottom within said inner vessel and an open ended discharge pipe extending from adjacent the bottom of said inner vessel below said false bottom up through the cover of said casing and provided with a coupling to which a pipe may be attached for withdrawing the contents from the inner vessel.

ALFRED B. RICE.

Witnesses:
JAMES H. PEIRCE,
KATHARINE GERLACH.